UNITED STATES PATENT OFFICE.

GEORG MERLING, OF ELBERFELD, AND OTTO CHRZESCINSKI AND HUGO KÖHLER, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

BETA-ACETYL-ALKYL-DIALKYLAMINS.

1,126,549.

Specification of Letters Patent. Patented Jan. 26, 1915.

No Drawing. Application filed June 5, 1913. Serial No. 771,872.

*To all whom it may concern:*

Be it known that we, GEORG MERLING, OTTO CHRZESCINSKI and HUGO KÖHLER, doctors of philosophy, chemists, citizens of the German Empire, residing, respectively, in Elberfeld and Leverkusen, near Cologne-on-the-Rhine, Germany, have invented new and useful Improvements in Beta-Acetyl-Alkyl-Dialkylamins, of which the following is a specification.

The present invention concerns the production of the hitherto unknown keto compounds of the formula:

(R=hydrogen or alkyl, R′=alkyl *e. g.*, ethyl) which have proved to be valuable intermediate products for the manufacture of erythrene and its homologues. The process for their production proceeds in the same manner as described in the specification of the Patent No. 1,070,622. These reactions proceed *e. g.* according to the following equations:

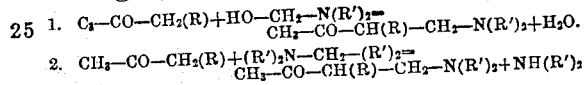

(R=hydrogen or alkyl, R′=alkyl *e. g.* ethyl.)

In order to illustrate the new process more fully the following examples are given, the parts being by weight:

Example 1: Production of beta-acetyl-ethyl-diethylamin from tetraethyldiamino-methane and acetone. 750 parts of aqueous formaldehyde (40 per cent.) are gradually dropped into 3245 parts of aqueous diethylamin solution (45 per cent.) which is being stirred and cooled and 2000 parts of acetone, 400 parts of baryta water (saturated at ordinary temperature) and 500 parts of water are then added. After 20 days' heating from 25 to 30° C. bicarbonate is added to the brown solution in order to remove the baryta. Barium carbonate is removed by filtration. The oil is separated with potash from the filtrate and dried over potash. The excess of acetone is removed by distillation *in vacuo* and the remaining mixture of bases is decomposed by a fractional distillation *in vacuo* to beta-acetyl-ethyldiethylamin (fractions from about 60–80° C. 16 mm.). This base is a colorless oil having an intense ammoniacal smell, difficultly soluble in water and boils at 72–76° C. (16 mm.).

Example 2: Production of beta-acetyl-propyldiethylamin

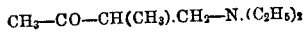

with the aid of tetraethyldiaminomethane and methylethylketone.

292 parts of an aqueous diethylamin solution (50 per cent.) are gradually dropped into 75 parts of aqueous formaldehyde (40 per cent.) while well stirring and cooling. This mixture forming two layers, is mixed with 210 parts of methylethylketone and boiled on the reflux condenser for so long a time as a test portion after acidulation with acetic acid is not any more rendered turbid by a solution of anilin acetate which requires about some hours. The solution is then dehydrated with potash and worked up in the same manner as described in Example 1, whereby an analogous result is obtained. The new beta-acetylpropyldiethylamin of the formula:

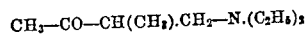

is a colorless oil having a little ammoniacal smell, difficultly soluble in water and boils at 77–78° C. (16 mm.).

We claim:—

1. As new products the beta-acetylalkyl-dialkylamins of the formula graphically represented:

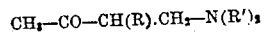

where R=hydrogen or alkyl and R′=alkyl, which are colorless oils having an intense ammoniacal smell, being difficultly soluble in water, substantially as described.

2. As new products beta-acetylalkyldi-ethylamins which are colorless oils having an intense ammoniacal smell, being difficultly soluble in water, substantially as described.

3. As new products the beta-acetylethyl-dialkylamins which are colorless oils having an intense ammoniacal smell, being difficultly soluble in water, substantially as described.

4. As new product the beta-acetylethyl-diethylamin of the formula

which is a colorless oil having an intense ammoniacal smell, difficultly soluble in water and boils at 72–76° C. (16 mm.), substantially as described.

In testimony whereof we have hereunto set our hands in the presence of two subscribing witnesses.

GEORG MERLING. [L. S.]
OTTO CHRZESCINSKI. [L. S.]
HUGO KÖHLER. [L. S.]

Witnesses:
  HELEN NUFER,
  ALBERT NUFER.